US008478577B2

(12) United States Patent
Ciolfi

(10) Patent No.: US 8,478,577 B2
(45) Date of Patent: Jul. 2, 2013

(54) MODELING OF A MULTIPROCESSOR SYSTEM

(75) Inventor: John Ciolfi, Wellesley, MA (US)

(73) Assignee: The Math Works, Inc., Natick, MA (US)

( * ) Notice: Subject to any disclaimer, the term of this patent is extended or adjusted under 35 U.S.C. 154(b) by 574 days.

(21) Appl. No.: 11/894,389

(22) Filed: Aug. 20, 2007

(65) Prior Publication Data

US 2007/0294074 A1    Dec. 20, 2007

Related U.S. Application Data

(63) Continuation of application No. 11/141,878, filed on May 31, 2005.

(51) Int. Cl.
*G06F 13/12* (2006.01)
(52) U.S. Cl.
USPC .......... 703/21; 703/13; 703/14; 703/19; 703/18; 709/223; 709/203; 709/251; 709/224; 709/200
(58) Field of Classification Search
USPC .......... 708/105; 718/107, 102; 703/27, 703/21, 22, 6; 712/203; 717/120, 101, 151
See application file for complete search history.

(56) References Cited

U.S. PATENT DOCUMENTS

| 5,428,803 | A | 6/1995 | Chen et al. |
| 5,625,831 | A | 4/1997 | Priest et al. |
| 5,649,198 | A | 7/1997 | Shibata et al. |
| 5,794,012 | A | 8/1998 | Averill |
| 5,838,948 | A | * | 11/1998 | Bunza ............... 703/27 |
| 5,870,588 | A | 2/1999 | Rompaey et al. |
| 5,878,241 | A | * | 3/1999 | Wilkinson et al. ........ 712/203 |

(Continued)

FOREIGN PATENT DOCUMENTS

EP    0780763 A1    6/1997

OTHER PUBLICATIONS

Ragunathan Rajkumar, Mike Gagliardi, Lui Sha The Real-Time Publisher/Subscriber Inter-Process Communication Model for Distributed Real-Time Systems: Design and Implementation 1080-1812/95 IEEE 1995.*

(Continued)

*Primary Examiner* — Omar Fernandez Rivas
*Assistant Examiner* — Cuong Luu
(74) *Attorney, Agent, or Firm* — Nelson Mullins Riley & Scarborough LLP

(57) ABSTRACT

Methods and systems are provided for modeling a multiprocessor system in a graphical modeling environment. The multiprocessor system may include multiple processing units that carry out one or more processes, such as programs and sets of instructions. Each of the processing units may be represented as a node at the top level of the model for the multiprocessor system. The nodes representing the processing units of the multiprocessor system may be interconnected to each other via a communication channel. The nodes may include at least one read element for reading data from the communication channel into the nodes. The node may also include at least one write element for writing data from the nodes into the communication channel. Each of the processing unit can communicate with other processing unit via the communication channel using the read and write elements. Code may be generated to simulate each node and communication channel in the modeled multiprocessor system. The generated code may then be executed to simulate the model. Based on the results of the simulation, one or more processes may be automatically reassigned to nodes within the model to optimize the performance of the model.

18 Claims, 14 Drawing Sheets

U.S. PATENT DOCUMENTS

| | | | |
|---|---|---|---|
| 6,789,054 | B1 | 9/2004 | Makhlouf |
| 6,877,155 | B1 | 4/2005 | Lindsey |
| 7,401,333 | B2 * | 7/2008 | Vandeweerd ............... 718/102 |
| 7,552,042 | B1 | 6/2009 | Brebner et al. |
| 2002/0144010 | A1 | 10/2002 | Younis et al. |
| 2003/0056202 | A1 | 3/2003 | May et al. |
| 2003/0107595 | A1 | 6/2003 | Ciolfi |
| 2003/0118081 | A1 | 6/2003 | Philips et al. |
| 2004/0006584 | A1 * | 1/2004 | Vandeweerd ............... 709/107 |
| 2005/0060408 | A1 | 3/2005 | McIntyre et al. |
| 2005/0267901 | A1 | 12/2005 | Irlen |
| 2006/0064178 | A1 | 3/2006 | Butterfield et al. |
| 2006/0101104 | A1 * | 5/2006 | Bhanot et al. ............... 708/105 |
| 2006/0173601 | A1 | 8/2006 | Bassiere et al. |
| 2006/0235548 | A1 | 10/2006 | Gaudette |

OTHER PUBLICATIONS

European Office Action for Application No. 06771710.8, dated Jul. 7, 2009.

Andersson, Michael et al., "Utilizing UML in SDL-based development," *Computer Network*, vol. 35:613-625 (2001).

Becker, Leandro B. et al., "SIMOO-RT—An Object-Oriented Framework for the Development of Real-Time Industrial Automation Systems," *IEEE Transactions on Robotics and Automation*, vol. 18(4):421-430 (2002).

He, Hai et al., "A generic framework for modeling heterogeneous real-time systems," *Computer Standards & Interfaces*, vol. 28:43-58 (2005).

Ramos-Hernandez, D.N. et al., "A novel object-oriented environment for distributed process control systems," *Control Engineering Practice*, vol. 13:213-230 (2005).

Redell, Ola, "The AIDA toolset for design and implementation analysis of distributed real-time control systems," *Microprocessors and Microsystems, IPC Business Press Ltd.*, vol. 28(4):163-182 (2004).

International Search Report for Application No. PCT/US2006/021085, dated Dec. 8, 2006.

European Summons to Oral Proceedings for Application No. 06771710.8, dated Aug. 31, 2010.

De Wet, Nico, "Model Driven Communication Protocol Engineering and Simulation Based Performance Analysis Using UML 2.0," A dissertation submitted to the Department of Computer Science, Faculty of Science, a the University of Cape Town in Fulfillment of the Requirements for the Degree of Master of Science, (2004).

* cited by examiner

MODELING OF A MULTIPROCESSOR SYSTEM

RELATED APPLICATION

This application is a continuation under 35 U.S.C. §120 of U.S. patent application Ser. No. 11/141,878, filed May 31, 2005, titled, "Modeling Of A Multiprocessor System," the entire disclosure of which is hereby incorporated by reference for all purposes.

FIELD OF THE INVENTION

The present invention relates generally to graphical programming or modeling environments and more particularly to modeling a multiprocessor system in the graphical programming or modeling environments.

BACKGROUND OF THE INVENTION

Various classes of graphical models describe computations that can be performed on application specific computational hardware, such as a computer, microcontroller, FPGA, and custom hardware. Classes of such graphical models may include time-based block diagrams such as those found within Simulink® from The MathWorks, Inc. of Natick, Mass., state-based and flow diagrams such as those found within Stateflow® from The MathWorks, Inc. of Natick, Mass., physical models such as those found within SimMechanics from The MathWorks, Inc. of Natick, Mass., discrete-event based diagrams, data-flow diagrams, and software diagrams such as those within the Unified Modeling Language (UML). A common characteristic among these various forms of graphical models is that they define semantics on how to interpret or execute the model.

In modeling a system in a graphical modeling environment, the system to be modeled often consists of a multiprocessor system, either a distributed embedded system or a parallel computing system. In the distributed embedded system, each processor has a defined role and generally performs different tasks from other processors. In the parallel computing system, an algorithm, such as a filtering algorithm, is decomposed by examining its structure and different portions are executed in parallel to produce the answer faster. The conventional block diagram modeling environment does not work well to model the multiprocessor system. Therefore, it is desired to provide new methods and systems for modeling the multiprocessor system in the block diagram modeling environment.

SUMMARY OF THE INVENTION

The present invention provides for programming or modeling a multiprocessor system in a graphical programming or modeling environment, such as a block diagram environment. The present invention provides two different views of a model reflected within the model, including the functional view of the model and the architectural (or deployment) view of the model. Users may create a functional view of the model in which the model is represented as functional units and each unit performs a specific functional operation. The architectural view of the model may be generated based on the functional view of the model. The architectural view of the model includes multiple processing units (or processors) that carry out one or more processes (or tasks), such as programs and sets of instructions, and the functional units can be mapped to the processing units. For example, each of the functional units may be mapped to a different processor, a certain unit may be mapped to multiple processors, or several units may be mapped to a single processor. Alternatively, users may be able to create and edit the deployment view of the model to include functional elements or components in the processing units independently of the functional view of the model.

In the architectural view of the model for the multiprocessor system, each of the processing units may be represented as a node at the top level of the model for the multiprocessor system. The nodes represent processing units that execute in their own process, thread or task. The nodes representing the processing units of the multiprocessor system may be interconnected to each other via a communication channel. The nodes may include a read element or elements for reading data from the communication channel into the nodes. The nodes may also include a write element or elements for writing data from the nodes into the communication channel. Each of the processing units can communicate with other processing units via the communication channel using the read element or elements and the write element or elements. A node can also be hierarchical in that it contains multiple "sub-nodes" each representing a separate processor.

In one aspect of the present invention, a computer readable medium containing instructions executable by at least one processor includes one or more instructions for receiving information related to a plurality of processors contained in a multi-processing environment and parameters of the multi-processing environment and one or more instructions for receiving information related to a functional model, where the functional model includes multiple processes to be performed. The computer-readable medium further includes one or more instructions for creating multiple sub-models from the functional model, where the processes included in the functional model are distributed to the multiple sub-models based on optimization of the received information related to the multiple processors contained in the multi-processing environment and the parameters of the multi-processing environment.

In another aspect of the present invention, a computer-implemented method includes receiving a functional model of a multi-process system in a graphical modeling environment, the functional model including at least one functional unit. The method further includes decomposing the functional model into multiple sub-models, where each sub-model includes at least one process of the multi-process system and where at least two of the sub-models communicate with each other and create an inter-process channel (IPC) model for representing dynamics of reading and writing operations between the at least two communicating sub-models for generating a model for a multiprocessor system in a modeling environment.

In still another aspect of the present invention, a device may include means for enabling a user to create a functional model for a multi-process system and means for decomposing the functional model into multiple sub-models which read and write data over communication channels. The device may further include means for generating code to simulate each sub-model and each communication channel and means for executing the generated code for each sub-model and each communication channel in order to simulate the functional model of the multi-process system. The device may also include means for evaluating the simulated functional model of the multi-process system.

In still another aspect of the present invention, a device may include a user interface for enabling a user to create a functional model for a multi-process system in a graphical modeling environment and for enabling a user to enter weights associated with operating parameters of the multi-process system. The device may further include a decomposition engine for decomposing the functional model into multiple sub-models that communicate over communication channels, where each sub-model includes at least one process of the multi-process system and each communication channel represents dynamics between communicating sub-models, where the decomposition engine creates the sub-models based on an analysis and optimization of the operating parameters of the multi-process system.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1A:
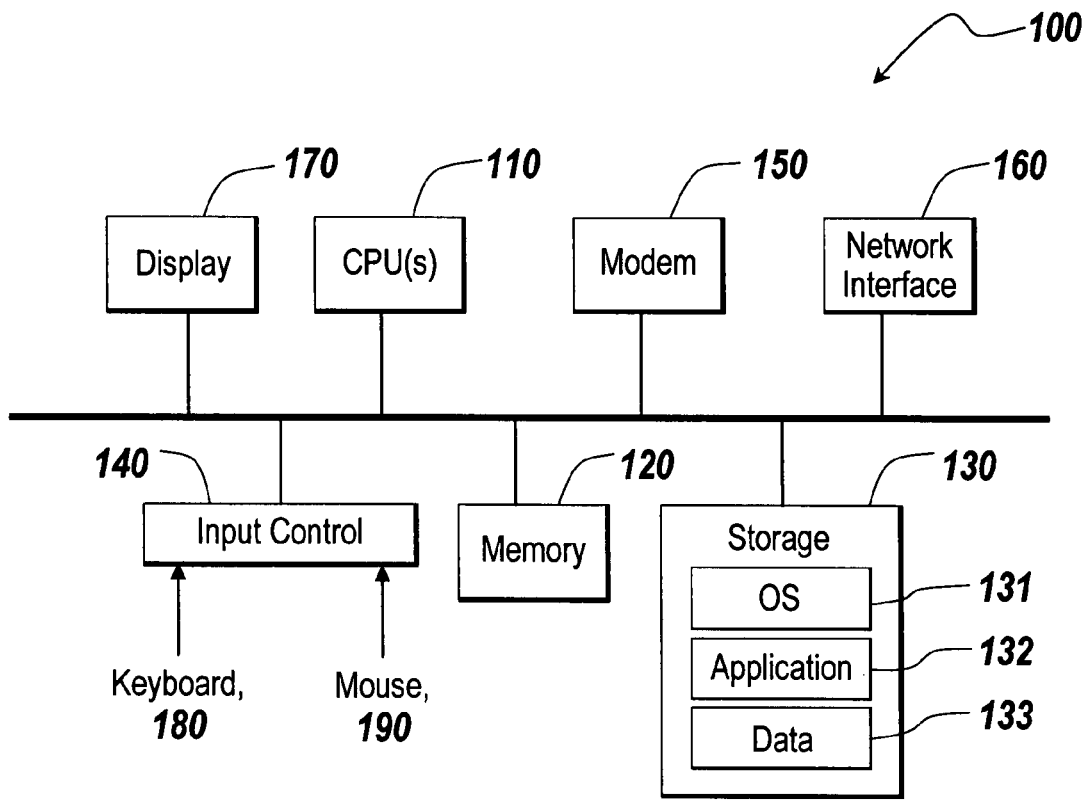
FIG. 1A is an exemplary electronic device suitable for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a graphical programming or modeling environment in which a graphical program or model is simulated/executed or code is generated for the model. The terms "program/programming" and "model/modeling" will be used interchangeably in the description of the illustrative embodiment. In the description of the illustrative embodiment, the simulation of the graphical program/model is also referred to as the execution of the program/model.

The illustrative embodiment will be described below solely for illustrative purposes relative to a time-based block diagram and event-based diagram environment. Although the illustrative embodiment will be described relative to the time-based block diagram environment, one of skill in the art will appreciate that the present invention may apply to other graphical programming/modeling environments, including state-based, event-based, data flow diagram, physical diagram environments, and software diagram environments such as the Unified Modeling Language (UML) environment, as long as the graphical model has some notion of semantics that allows it to be interpreted or transformed into an executable for a computer processor/microcontroller or directly synthesized in application-specific hardware.

An exemplary time-based block diagram environment can be found in Simulink® from The MathWorks, Inc. of Natick, Mass. Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user interface that allows drafting of block diagrams of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® also allows users to simulate the designed target systems to determine the behavior of the systems. Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor, such as the textual interface provided in MATLAB®. Using this textual interface, users may write special scripts that perform automatic editing operations on the block diagram. Simulink® also allows users to simulate the designed target systems to determine the behavior of the systems. Simulink® includes a block diagram execution engine that carries out the task of compiling and linking the block diagram to produce an "in-memory executable" version of the model that is used for generating code and/or simulating a block diagram model.

The illustrative embodiment will be described below relative to a Simulink® model. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

The illustrative embodiment of the present invention provides for modeling a multiprocessor system in a block diagram modeling environment. The illustrative embodiment of the present invention provides two different views of a model for the multiprocessor system, including the functional view of the model (hereinafter referred to as "the functional model") and the architectural (or deployment) view of the model (hereinafter referred to as "the deployment model"). The functional model is represented as functional units and each unit is configured to include one or more elements that perform a specific functional operation. The deployment model includes multiple processing units (or processors) carrying out one or more processes (or tasks), such as programs and sets of instructions. In the illustrative embodiment, the functional units in the functional model can be mapped to the processing units or processors in the deployment model. For example, each of the functional units may be mapped to a different processor, a certain functional unit may be mapped to multiple processors, or several functional units may be mapped to a single processor.

This feature of the present invention enables a plurality of teams to work on separate functional units in a single model and the separate functional units to be combined into the deployment model. For example, when modeling a vehicle system, a plurality of teams can work on separate functional units of the vehicle system, including an engine unit, a brake unit, etc. The vehicle system includes multiple processors to which the functional units of the vehicle system are mapped so that the functions of the units are performed by the multiple processors. In the illustrative embodiment, the designer who works with the functional model in general doesn't need to be concerned with the details of the deployment model because the functional model is automatically deployed to the deployment model.

Alternatively, users can be allowed to create and edit the deployment model directly to include functional elements or blocks in the processing units independently of the functional model. When the users directly create a deployment model, there is no functional model and the users are free to edit and rearrange the deployment model as they wish. However, if the users start creating a functional model, and then request the system to generate a deployment model, the users may be restricted in editing the deployment model. For example, it may be desirable to disallow editing the structure of the deployment model. Editing within the nodes of the deployment model can be allowed. The restrictions are optional, but aid in ensuring that the deployment model is synchronized with the functional model. In particular, if the users regenerate the deployment model, their edits to the previously generated deployment model should not be lost. Ensuring those edits to the previously generated deployment model are not lost is achieved by restricting the type of edits such that the edits can be automatically translated back to the functional model. For example, the functional model may contain units that are mapped to specific processors in the deployment model. If the users edit with the unit and don't change the external interface (e.g, inputs and outputs) of the unit, then the changes can be automatically updated or reflected in the functional mode.

In the illustrative embodiment, the term "multiprocessor system" generally refers to a system in which two or more coupled processors each carry out one or more processes (or tasks), such as programs and sets of instructions. In the multiprocessor system, each processor or processing units works on a different set of instructions or on different parts of a same process. The processing units are represented as nodes in the model of the multiprocessor system. The nodes representing the processing units are coupled to each other via a communication channel such as an Inter-Process Communication (IPC) channel. The IPC channel may include shared memory, a high speed bus, such as VERSA Module Eurocard (VME) bus, a broadcast medium, such as Controller Area Network (CAN) and Ethernet, etc. The nodes representing the processing units of the multiprocessor system reference sub-models implementing the processing units of the multiprocessor system. The sub-models referenced by the nodes include at least one read block for reading data from the IPC channel. The sub-models also include at least one write block for writing data into the IPC channel. Each of the sub-models can communicate with other sub-models via the IPC channel using the read blocks and the write blocks. A node can also be hierarchical in that it contains multiple "sub-nodes" each representing a separate processor or processing unit.

In the illustrative embodiment of the present invention, a multiprocessor system can be categorized as a distributed embedded system or a parallel computing or processing system. In the distributed embedded system, each processor has a defined role and performs different tasks from other processors. In the parallel computing or processing system, an algorithm, such as a filtering algorithm, is performed by executing different portions of the algorithm in parallel on different processors to produce the answer faster. The illustrative embodiment of the present invention will be described below relative to an example of the distributed embedded system and an example of the parallel computing system.

FIG. 1A is an exemplary electronic device 100 suitable for practicing the illustrative embodiment of the present invention, which provides a block diagram modeling environment. One of ordinary skill in the art will appreciate that the electronic device 100 is intended to be illustrative and not limiting of the present invention. The electronic device 100 may take many forms, including but not limited to a workstation, server, network computer, Internet appliance, mobile device, a pager, a tablet computer, and the like.

The electronic device 100 may include a Central Processing Unit (CPU) 110, a memory device 120, storage medium 130, an input control 140, a network interface 160, a MODEM 150, a display 170, etc. The input control 140 may interface with a keyboard 180, a mouse 190, and other input devices. The electronic device 100 may receive through the input control 140 input data necessary for creating models in the block diagram modeling environment, such as the selection of the attributes and operations of component blocks in the models. The electronic device 100 may display in the display 170 the models generated in the block diagram modeling environment. The network interface 160 and the MODEM 150 enable the electronic device 100 to communicate with other electronic devices through communication networks, such as Internet, intranet, CAN (Controller Area Network), LAN (Local Area Network), WAN (Wide Area Network) and MAN (Metropolitan Area Network) and through high speed shared data busses such as PCI (Peripheral Component Interconnect) or high-speed CPU interconnects The communication facilities may support for the distributed implementations of the present invention.

The CPU 110 controls each component of the electronic device 100 to provide the block diagram modeling environment. The electronic device 100 may include more than one CPUs 110 for speeding up the execution of programs or software running in the device 100. In particular, the multiple CPUs 110 can be utilized in the simulation or code generation of a multiprocessor system model, which will be described below in more detail with reference to FIG. 2B. The memory 120 fetches from the storage 130 and provides to the CPU 110 code that needs to be accessed by the CPU 110 to operate the electronic device 100 and to run the block diagram modeling environment. The storage 130 usually contains software tools for applications. The storage 130 includes, in particular, code 131 for the operating system (OS) of the device 100, code 132 for applications running on the operation system, such as applications for providing the block diagram modeling environment, and data 133 used or generated in the device 100, such as the data for block diagram models generated in the block diagram modeling environment.

Figure 1B:
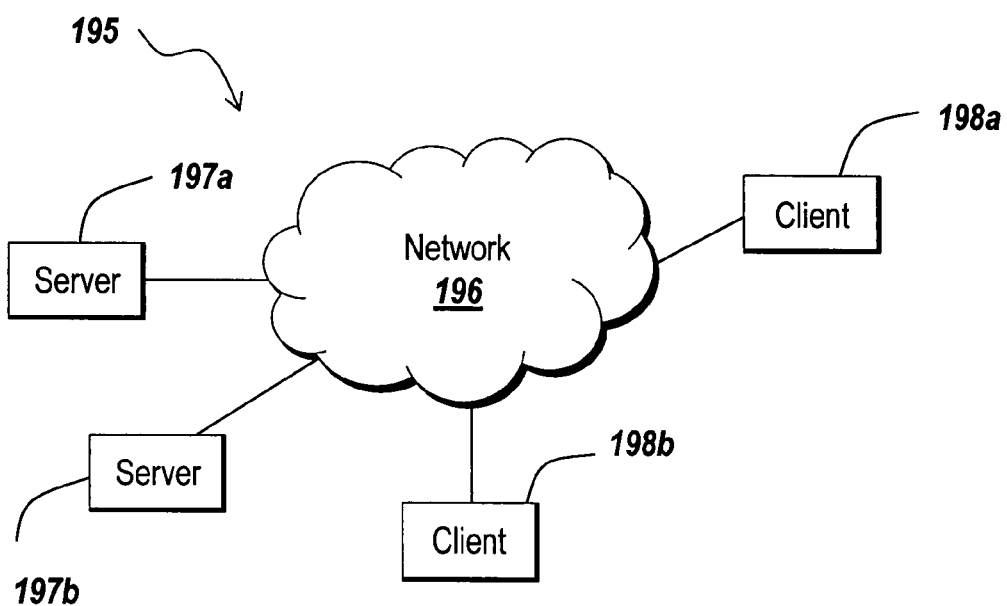
FIG. 1B shows an exemplary network environment suitable for practicing the illustrative embodiment of the present invention.

FIG. 1B is an exemplary network environment 195 suitable for the distributed implementation of the illustrative embodiment. The network environment 195 may include a server or multiple servers 197a and 197b coupled to clients 198a and 198b via a communication network 196. The servers 197a and 197b and clients 198a and 198b can be implemented using the computing device 100 depicted in FIG. 1A. The network interface 160 and the modem 150 of the computing device 100 enable the servers 197a and 197b to communicate with the clients 198a and 198b through the communication network 196. The communication network 196 may include Internet, intranet, LAN (Local Area Network), WAN (Wide Area Network), MAN (Metropolitan Area Network), etc. One of skill in the art will appreciate that the servers 197a and 197b and the clients 198a and 198b are illustrative and any other servers and client can be coupled to the network 196.

In the network environment 195, the servers 197a and 197b may provide the clients 198a and 198b with software components or products under a particular condition, such as a license agreement. The software components or products may include those for providing a block diagram environment that enables users to create and simulate a block diagram. The software components or products may also include those for enabling users to create and simulate a deployment model in the block diagram environment. The servers 197a and 197b may send the clients 198a and 198b the software components or products under a specific license agreement. An exemplary licensing scheme is described in more detail in U.S. patent application Ser. No. 10/896,671 entitled "DYNAMIC LICENSING IN A DISTRIBUTED SYSTEM," which is incorporated herewith by reference.

The network environment 195 can support the distributed implementations of the present invention. In the distributed implementations of the present invention, the functional model and the deployment model can be created or generated on different servers and clients. For example, the users can create a functional model on the client 198a and sent it to the servers 197a and 197b for generating a deployment model based on the functional model. In addition, the servers 197a and 197b and the clients 198a and 198b can used to simulate or execute different processing units in the simulation/execution of the model.

Figure 2A:
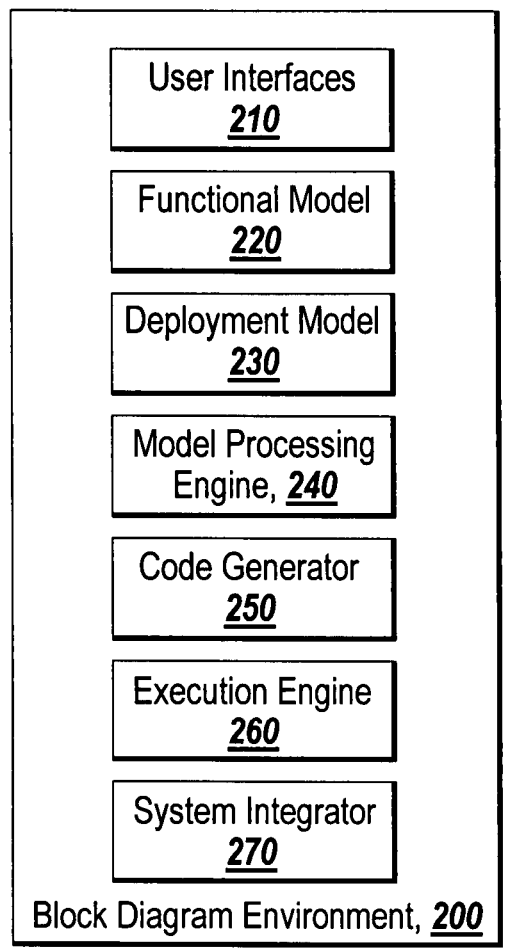
FIG. 2A is an exemplary block diagram environment in which the illustrative embodiment of the present invention can be practiced.

FIG. 2A depicts an exemplary block diagram environment 200 provided to practice the illustrative embodiment of the present invention. The block diagram environment 200 may include user interfaces (UIs) 210, a model processing engine 240, a code generator 250, a model execution engine 260, and an integrator 270, which will be described below in more detail with reference to FIG. 2B.

Figure 2B:
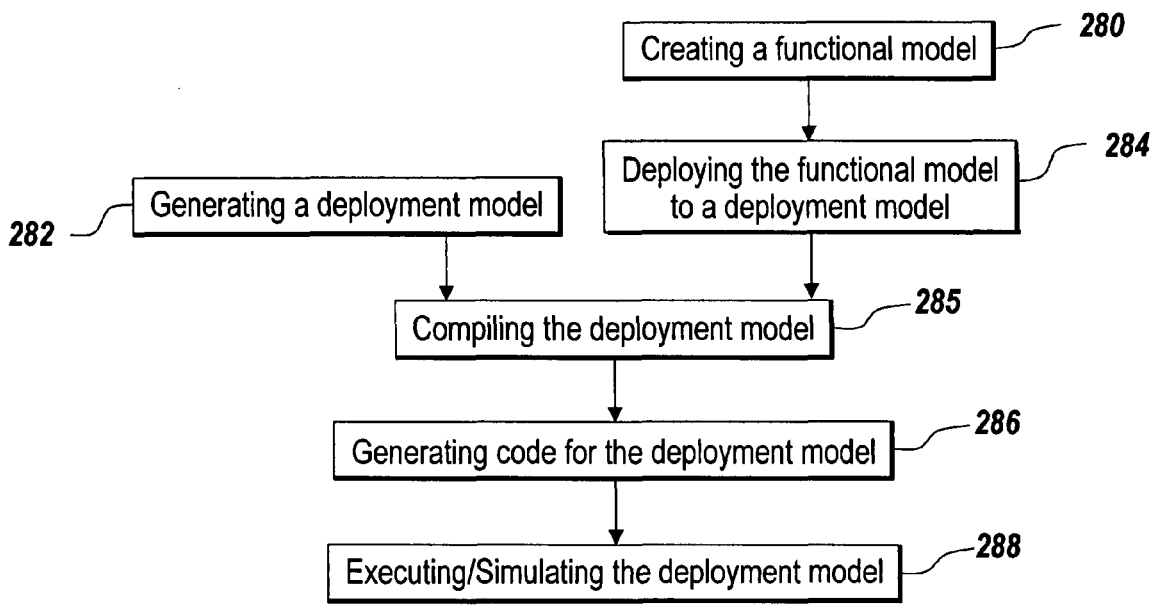
FIG. 2B is a flow chart showing an exemplary operation of the block diagram environment for modeling a multiprocessor system in the illustrative embodiment of the present invention.

FIG. 2B is a flow chart showing an exemplary operation for modeling a multiprocessor system and simulating the model in the block diagram modeling environment 200. Users may build a functional model 220 for the multiprocessor system in the block diagram modeling environment 200 (step 280).

Distributed Embedded System

Figure 3A:
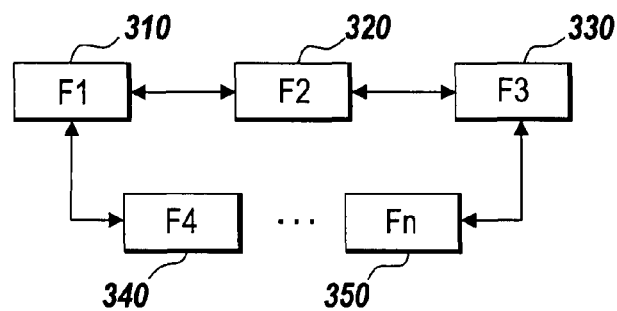
FIG. 3A is an exemplary functional model for a distributed embedded system in the illustrative embodiment of the present.

FIG. 3A is an exemplary functional model 220 for a distributed embedded system in the illustrative embodiment of the present. The functional model 220 includes functional units (F1, F2, . . . , Fn) 310-350. Each of the functional units (F1, F2, . . . , Fn) 310-350 is configured to include one or more blocks that perform a specific functional operation. The user interfaces 210 allow users to draw, edit, annotate, save, and print out block diagram representations. In building the block diagram model 220, users may use graphical user interfaces (GUIs) provided in the block modeling environment 200. Methods are called by the block diagram modeling environment 200 in order to render the block appropriately in the GUI of its parent block diagram. For instance, this set of methods may include a BlockDrawIcon method that determines the shape the block icon has on the GUI. The block diagram modeling environment 200 may allow users to specify the parameters for the block when they use it in the model. The users generally interact with a set of windows that act as canvases for the model. There is generally more than one window for a model because models may be partitioned into multiple hierarchical levels through the use of subsystems.

In the functional model 220, the designer works and in general doesn't need to be concerned with the details of the deployment model 230 with the processing units. The system integrator 270 decomposes each functional unit (F1, . . . , Fn) 310-350 to the processing units in the deployment model, which will be described below in more detail with reference to FIG. 3B and FIG. 3C. This feature of the present invention may help a plurality of teams design functional units separately at the same time in a project and combine the separate functional units into a deployment model 230. Thus, it may be desirable to disallow editing the structure of the deployment model 230. Editing within the nodes of the deployment model 230 can be allowed. This can be achieved by restricting the edits to not altering the hierarchical structure of the deployment model 230. Alternatively, users can create the deployment model 230 and edit the deployment model 230 to include one or more blocks independently of the functional model 220.

Referring back to FIGS. 2A and 2B, the system integrator 270 maps the functional units in the functional model 220 to the processing units in the deployment model 230 (step 284). The system integrator 270 is a process that contains additional information provided by the user specifying how to map the functional units in the functional model 220 to the processing units in the deployment model 230.

Figure 3B:
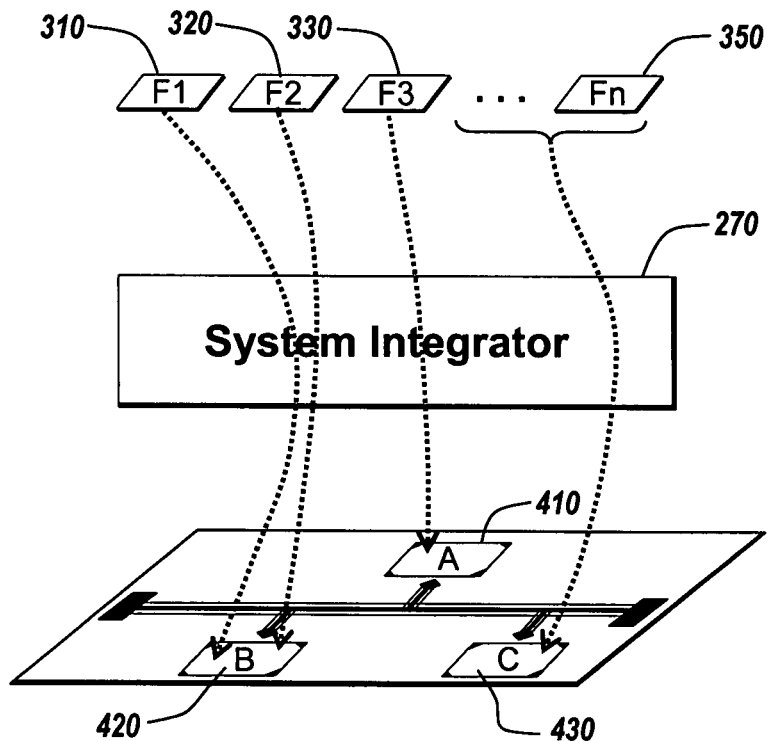
FIG. 3B depicts an exemplary system integrator for mapping functional units in the functional model to the processing units in the deployment model.

FIG. 3B depicts an exemplary system integrator 270 for mapping functional units in the functional model 220 to the processing units in the deployment model 230. With reference to FIG. 3C, the system integrator 270 receives inputs from the user specifying the architecture of the deployment environment (step 490). This information contains the enumeration of processing units and specification of the processing characteristics of each unit, including the memory size, memory access characteristics, cache size, floating point characteristics, processor architecture and the processing speed. The information also contains an enumeration of the inter-process communication units describing the communication capacity, speed and error (packet loss, Bit Error Rate) characteristics. The user also describes the protocol for the inter-process communication channel which cane be done by using IPC channel "Read" and "Write" blocks. Again with reference to FIG. 3C, the user then assigns blocks to the previously defined processing units (step 491). The user may assign multiple blocks to a single process or a single block to multiple processes, which will be described below in more detail with reference to FIG. 3D. This gives the user the flexibility to support multi-path optimization and a method to implement redundancy for robustness of the deployment model. The system integrator 270 then checks the assignment and ensures that the functional and deployment views model the same functionality (step 492). If a conflict is found (step 493) the user is asked to revise the architecture of block assignment. Given the consistent deployment model (step 493), the system integrator 270 then calculates the complexity of the deployment model (step 494). The complexity is a function of the processing characteristics and the inter-process communication channel characteristics. The complexity is specified by assigning multi-valued labels to data paths in the functional model. The various values in the labels include end-to-end delay, average delay, memory requirement, communication capacity requirements. The results of the analysis are reported to the user and based on these results the user may modify both the architecture specification and the block assignment to improve the complexity of the deployment model (step 495).

Figure 3D:
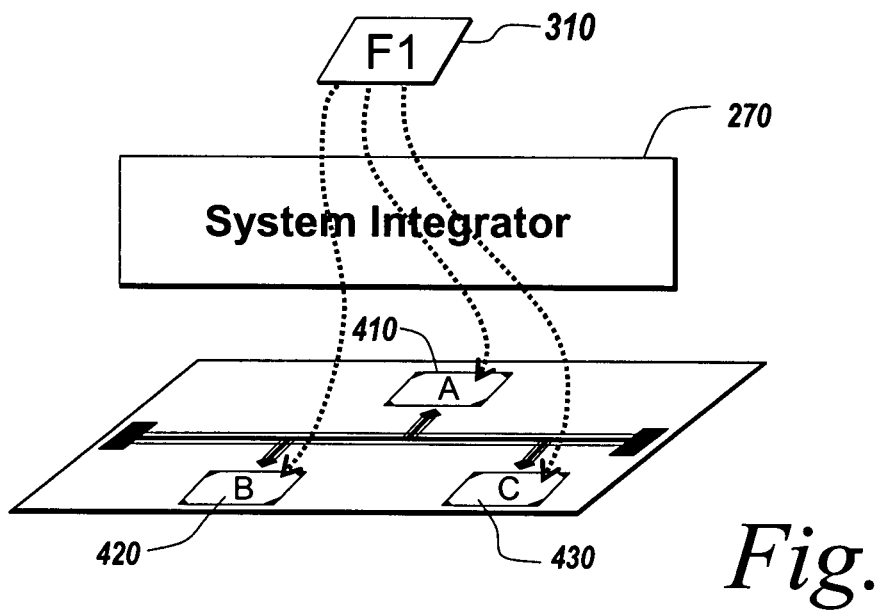
FIG. 3D depicts an exemplary model of the distributed embedded system in which a functional unit is mapped to multiple processing units in the illustrative embodiment of the present invention.
Figure 3C:
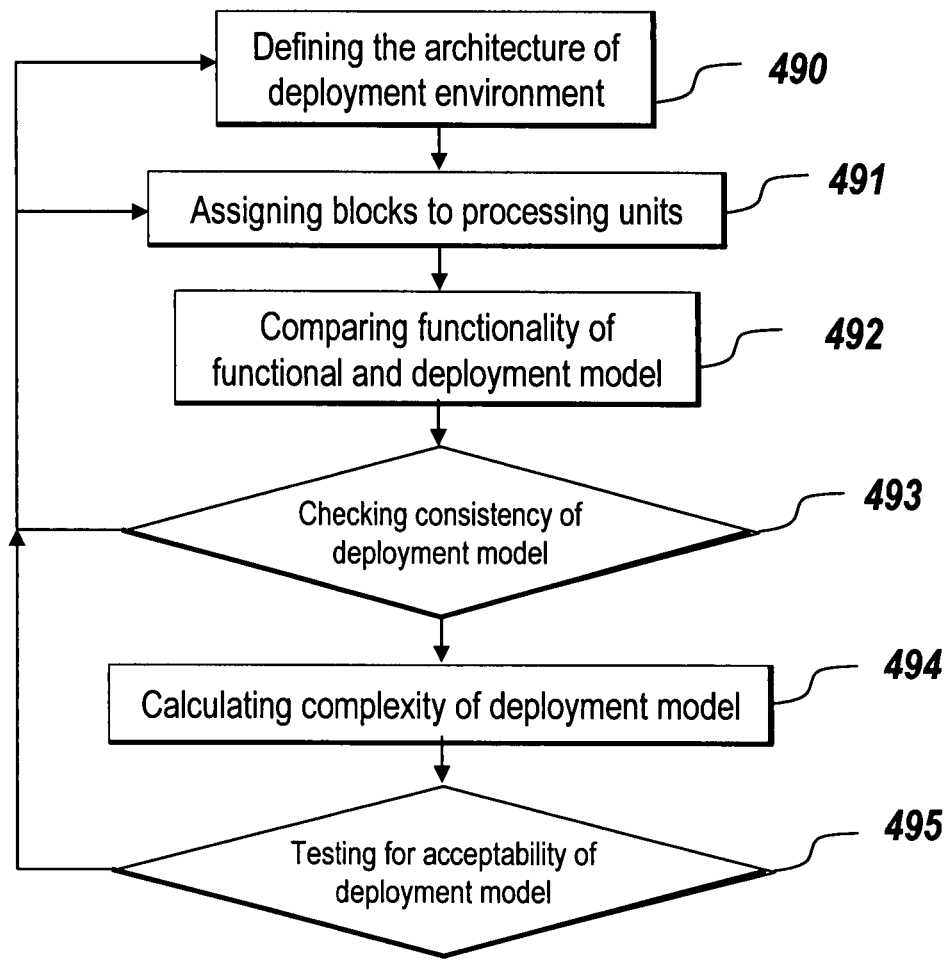
FIG. 3C is a flow chart describing the operation of the system integrator.

FIG. 3D depicts another example of mapping the functional units in the functional model 220 to the processing units in the deployment model 230. In the illustrative embodiment of the present invention, a functional unit 310 is mapped to multiple processing units 410-430. When an individual functional unit, such as a filtering process, is too complex to meet real-time requirement in a single processing unit, the complex functional unit can be mapped to multiple processing units so that the functional unit can be executed by the multiple processing units. The system integrator 270 may be configured to decompose the regular structure of the functional unit to a multi-node deployable model. Alternatively, custom tools can be used to rearrange the component onto a multimode model. The decomposition process will be described below in more detail with reference to FIGS. 8-11.

Referring back to FIGS. 2A and 2B, users may optionally create their own deployment model (step 282) for the multi-processor system in the block diagram modeling environment 200. When the user has directly created a deployment model via step 282, there is no functional model and the user is free to edit and rearrange the deployment model as they wish. However, if the user started by creating a functional model via step 280, and then asked the system integrator 270 to generate a deployment model, the user is restricted in what editing actions can be performed in the deployment model. The restrictions are optional, but aid in ensuring that the deployment model is synchronized with the functional model. In particular if the user where to regenerate the deployment model, their edits to the deployment model should not be lost. Ensuring that edits to the deployment model are not lost is achieved by restricting the type of edits such that the edits can be automatically translated back to the functional model. For example, the function model may contain units that are mapped to specific processors in the deployment model. If the user edits with the unit and doesn't change the external interface (e.g. inputs and outputs) of the unit, then the changes can be automatically updated or reflected in the functional model.

Figure 4A:
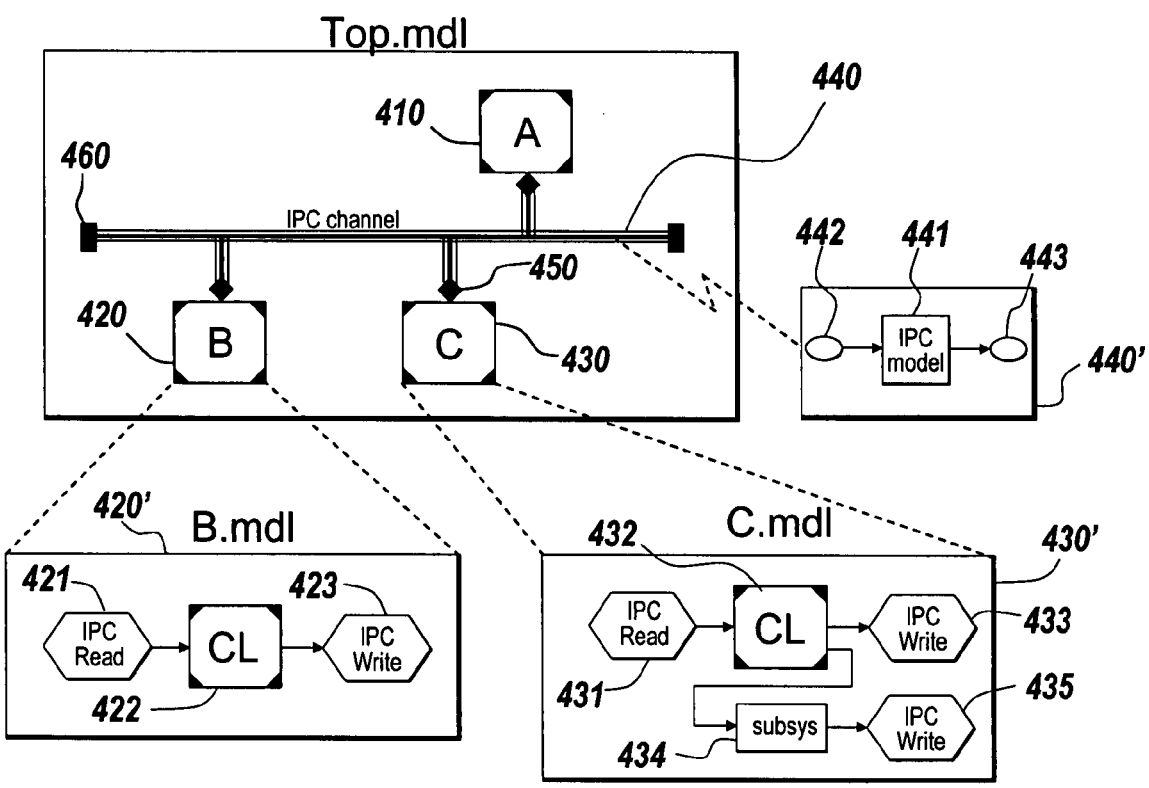
FIG. 4A depicts an exemplary deployment model of the distributed embedded system in which the functional units are mapped to the processing units in the illustrative embodiment of the present invention.

FIG. 4A depicts an example of the deployment model 230 in which the functional units 310-350 are mapped to the processing units 410-430 in the illustrative embodiment of the present invention. Alternatively, the deployment model 230 can be built by users editing the deployment model 230. The exemplary deployment model 230 includes the IPC channel 440 interconnecting the node blocks 410-430. If users click or double click the IPC channel 440, a model 440' for the IPC channel 440 may be provided in a separate window. The model 440' for the IPC channel 440 may include an IPC model 441, an input port 442 and an output port 443. The model 440' for the IPC channel 440 represents the communication delay, lost packets and/or other characteristics of the IPC channel 440. The model 440' associated with the IPC channel 440 may be preconfigured with input port block 442 and the output port block 443 defining the point-to-point communication topology.

Figure 4B:
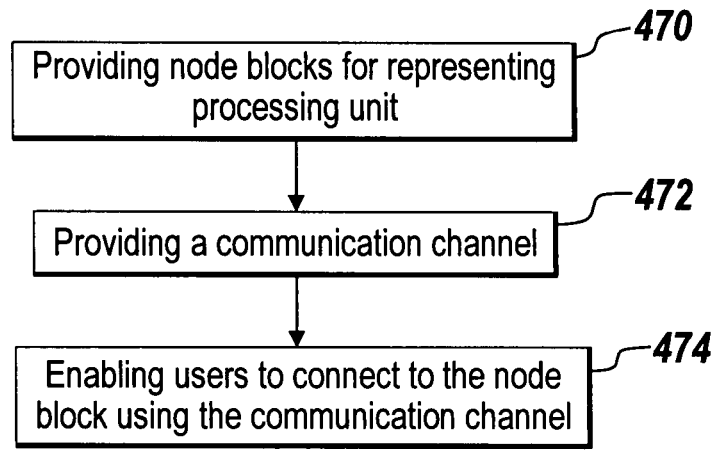
FIG. 4B is a flow chart showing an exemplary operation for providing or building the deployment model of the distributed embedded system.

FIG. 4B is a flow chart showing an exemplary operation for providing or enabling users to build a deployment model 230 for a distributed embedded system in the block diagram modeling environment 200. In the illustrative embodiment, the block diagram modeling environment 200 provides node blocks 410-430 for representing processing units of the distributed embedded system (step 470). The node blocks 410-430 representing the processing units of the distributed embedded system may reference sub-models implementing the processing units of the multiprocessor system. A node block can also be hierarchical in that it contains multiple "sub-nodes" each representing a separate processor or processing unit.

In the illustrative embodiment, the block diagram modeling environment 200 also provides the IPC channel 440 for interconnecting the node blocks 410-430 in the deployment model 230 of the distributed embedded system model (step 472). The IPC channel 440 may include an Inter-Process Communication (IPC) channel, such as shared memory, a high speed VME bus, a broadcast medium including CAN and Ethernet, etc. The IPC channel 440 exchanges data between the processing units represented by the node blocks 410-430 either within the same computer or over a network. The IPC channel 440 may define a protocol that guarantees a response to a request. The node blocks 410-430 are interconnected with each other via the IPC channel 440. The processing units represented by the node blocks 410-430 are portions of the embedded processing system that carry out at least one process or a set of instructions in the distributed embedded system. The processing units may include at least one processor of the distributed embedded system that receives input data and manipulates the data to produce output results.

The block diagram modeling environment 200 may provide a tool, such as the user interface 210, to enable users to build the deployment model 230 for the distributed embedded system using the node blocks 410-430 and the IPC channel 440 described above (step 474). In building the deployment model 230 of the distributed embedded system, a graphical element, such as the "diamond" adaptor/connector 450, may be added between the IPC channel 440 and each of the node blocks 410-430 to indicate that the node block can read and write data from/to the IPC channel. Another type of a graphical element 460 may be provided to enable the users to define the read and write operations of data from and into the IPC channel. The read and write operations will be described below in more detail with reference to FIG. 4C.

Figure 4C:
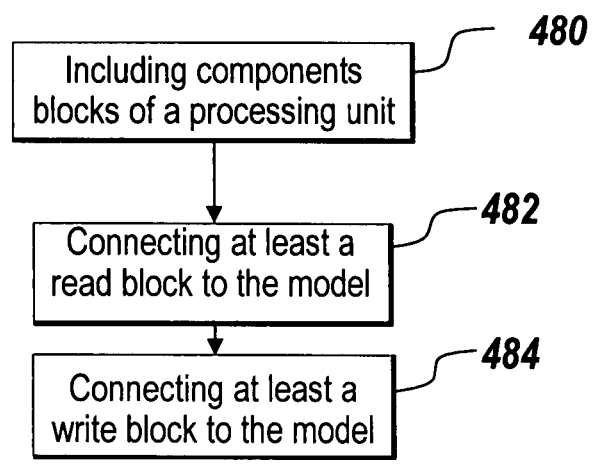
FIG. 4C is a flow chart showing an exemplary operation for building a processing unit of the deployment model in the illustrative embodiment of the present invention.

FIG. 4C is a flow chart showing an exemplary operation for implementing a sub-model for a processing unit referenced by a node block of the top model 230. In the illustrative embodiment of the present invention, the node blocks 410-430 reference the sub-models for the processing units of the distributed embedded system. For example, the graphical symbols of the node blocks 410-430 indicate that the node blocks 410-430 reference the sub-models for the processing units of the distributed embedded system. In the illustrative embodiment, the node blocks 420 and 430 reference the sub-models 420' and 430' for the processing units of the distributed embedded system. The sub-models 420' and 430' may include component blocks of the processing units (step 480). For example, the models 420' and 430' include blocks (CL) 422 and 432, respectively, that may reference the same sub-model. The model 430' additionally includes a subsystem block (subsys) 434 that does not reference another sub-model. The models 420' and 430' include at least one read block 421 and 431, respectively (step 482). The read blocks 421 and 431 read data from the IPC channel 440 and make the data available to the component blocks of the models 420' and 430', respectively. The models 420' and 430' also include at least one write block 423, 433 and 435 (step 484). The write blocks write data to the IPC channel 440 and send the data to other processing units of the distributed embedded system. The models 420' and 430' may include multiple read blocks and write blocks within a node, much like one can have multiple socket read and write calls in TCP/IP. The model 430' is an example that has two write blocks 433 and 435.

Users can extend the system by adding their own IPC read and write blocks via custom code. The IPC read and write blocks could be placed anywhere within the nodes hierarchy, but limiting them to the top-level of the node can simplify the presentation of the diagram to improve readability. Multiple read and write blocks are allowed to provide a means to identify different message types over the channel.

The read blocks and the write blocks may be implemented using the S-function capability (system-function) provided in Simulink®. The S-function is a computer language description of a user-defined block, for example in MATLAB, C, C++, Ada or Fortran. Using the open interface of the S-function, the read blocks and the write blocks can be created and added to the models. In the simulation or execution of the model 230, the read blocks and the write blocks may read and write signal values in the desired data type (e.g. doubles, singles, integers, etc.). The destination of data can be one or more depending on the IPC protocol defined by users using the open S-function interface. The operations and properties of the read blocks and the write blocks in the model 230 may be defined using the graphical element 460 provided in connection with the IPC channel 440 of the top model 230. For example, if users click or double click the graphical element 460, a user interface may be provided to define the operations and properties of the read blocks and the write blocks in the model 230. Using the user interface, the users can define the read blocks and the write blocks in the model 230.

Figure 5:
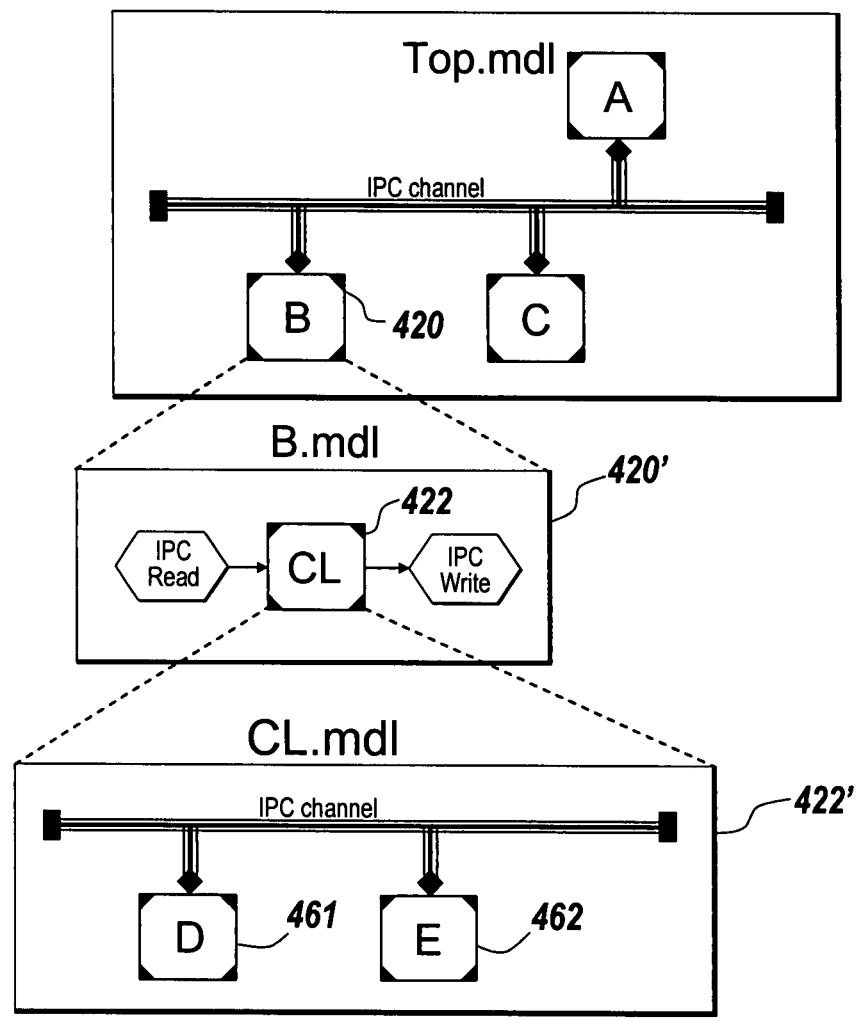
FIG. 5 depicts an exemplary deployment model of the distributed embedded system in which a processing unit is hierarchically nested in the illustrative embodiment of the present invention.

FIG. 5 depicts another exemplary deployment model having a hierarchical structure in the illustrative embodiment. In the hierarchical structure of the distributed embedded system, at least one node block of the deployment model 230 may reference a sub-model that implements another or second distributed embedded system. Or, at least one node block of the deployment model 230 may reference a sub-model that includes at least one "sub-node" representing another or second distributed embedded system. In FIG. 5, the exemplary sub-model 420' referenced by the node block 420 (Block B) includes a node block 422 representing another or second distributed embedded system. The sub-model 422' referenced by the node block 422 implements another or second distributed embedded system including node blocks 461 and 462 (Block D and Block E) for the processing units of the distributed embedded system. The node blocks 461 and 462 are interconnected with each other via the IPC channel 440. As shown in FIGS. 4A-4C, the sub-model 422' can be implemented in the same way as the top model 230.

Figure 6A:
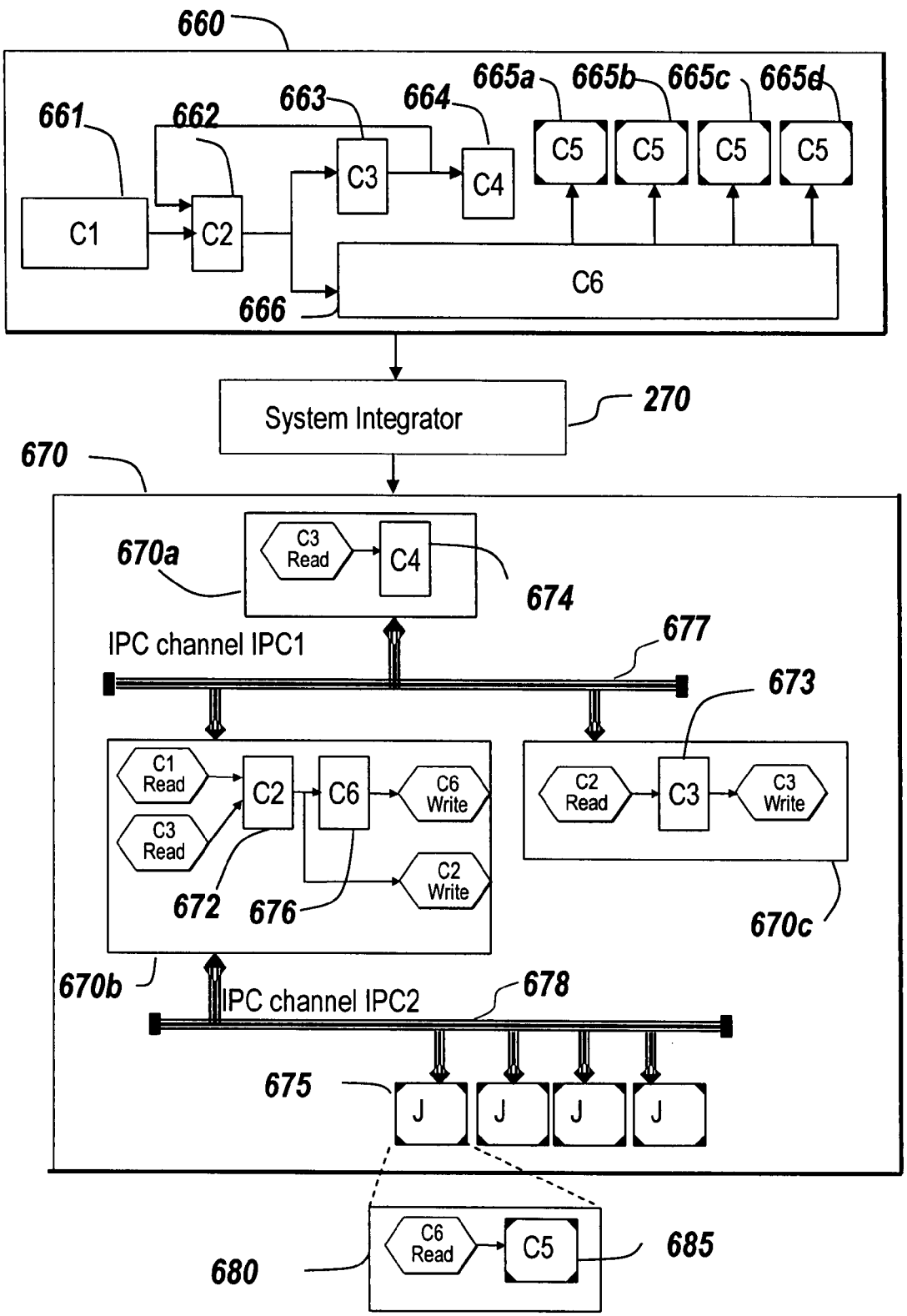
FIG. 6A is a detailed example showing the integration of a typical automotive control system.

FIG. 6A depicts a typical automotive example of mapping the function units to the deployment model through the system integrator. The C1 block 661 models the user input such as the input received through an accelerator pedal. The C2 and C3 blocks 662 and 663 model a feedback control law representing, for example, "Brake-by-wire" and "Electronic Throttle Control" capabilities found within an automobile. The output of C2 block 662 represents a vector valued signal that is to be fed into the braking actuators which are physically separated from the location at which the signal calculation occurs. This signal is "conditioned" by C6 block 666 and distributed to four identical braking actuators represented by the model reference C5 blocks 665a-665d. The second output of C3 block 663 represents the actuator signal to control the throttle body opening. The throttle controller is represented by C4 block 664. The system integrator is used according to the flow chart of FIG. 3C to produce the deployment model 670. The deployment model 670 consists of seven processing units. The four units labeled "J" 675 denote the processors that are used by the brake actuators of the automobile. These units communicate to the braking controller processing node 670b over the IPC channel IPC2 678. The braking controller is assigned the functional units C2 672 and C6 676 indicating that it is responsible for calculating the signals to be transmitted over IPC2 to the braking actuators 675. The braking controller is connected to yet another IPC channel IPC1 677. On this channel it performs the feedback control functions represented by the feedback control loop over the function blocks C2 to C3 to C2. Over the same IPC channel IPC2, the throttle controller 673 calculates and transmits the signals to control the throttle body opening through the throttle body actuator 674.

When the model executes, conceptually each of the seven top-level processing nodes, 670a, 670b, 670c, and the four J nodes start executing independently of each other. The IPC read and write blocks are used to synchronize communication. For example, 670a starts executing and when the code corresponding to the IPC C3 read block starts executing, C3 read blocks waiting for a message from processing node 670b. 670b will send a message via the C2 write block, which executes after C2, 672, has provided it with a message to forward to the IPC channel.

Figure 6B:
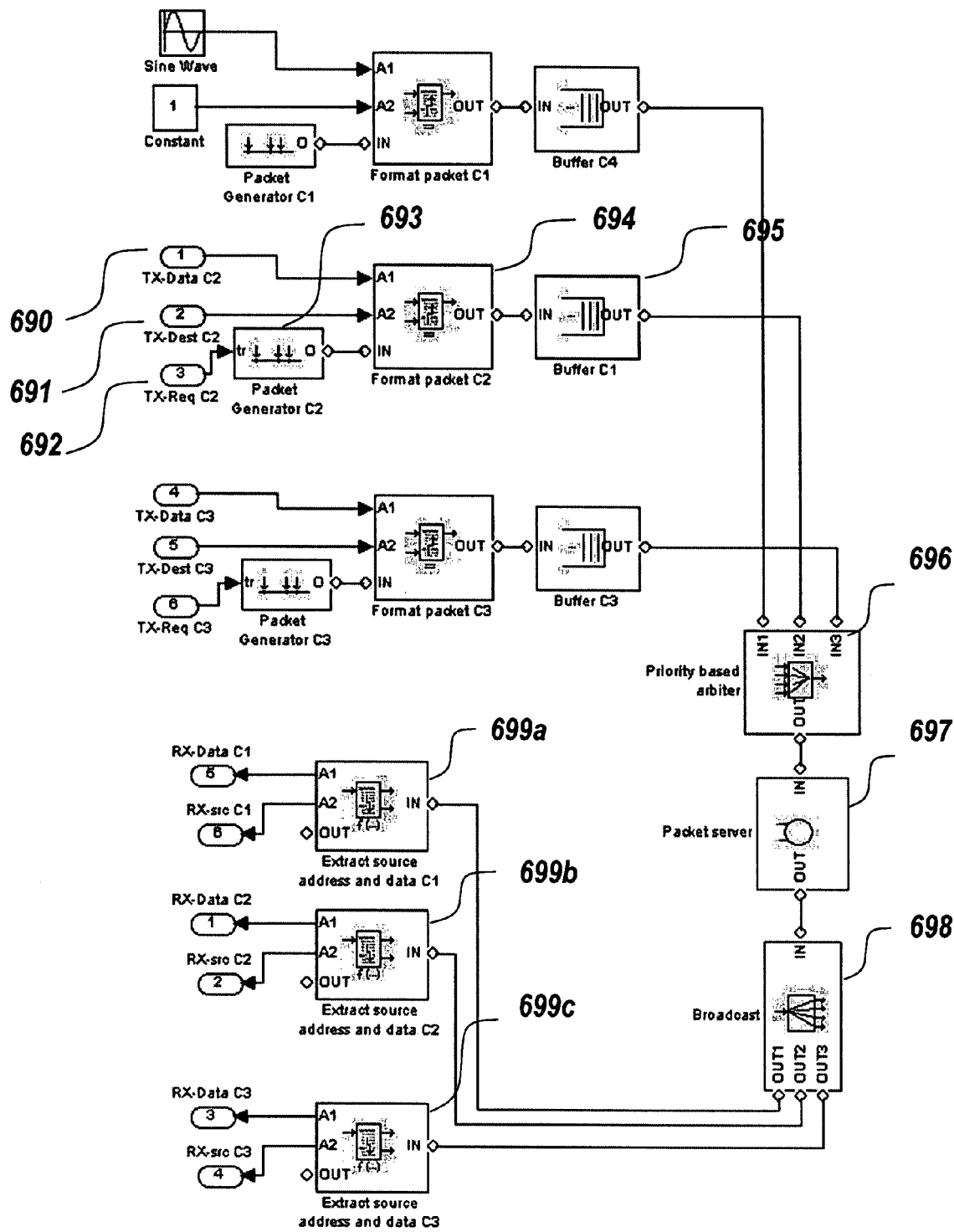
FIG. 6B is a detailed example showing the model of a priority based CAN with bus contention.

FIG. 6B depicts a detailed example of a discrete-event IPC channel model for the IPC channel 677. The illustrated model is a model of a CAN shared data bus with priority-based arbitration. The bus has two external inputs "Write C2" and "Write C3" and three external outputs "Read C1", "Read C2" and "Read C3". These inputs and outputs are connected to the IPC read/write blocks in 670. In the illustrated model, a packet is transmitted as follows. First, a transmission request occurs at the input port 692 through an IPC Write block. This request causes a packet to be generated by a packet generator 693. Subsequently, the contents of the generated packet (in particular, the data, source and destination areas) is populated and the remaining bits are stuffed by a formatting block 694. The formatted packet is then buffered by a buffer block 695 for subsequent transmission. At each transmission interval of the CAN bus, a priority based arbiter block 696 selects the highest priority message from the three source buffers and removes (consumes) the selected message. This message is then processed by the shared server block 697 and subsequently broadcast by a broadcast block 698 by copying the message into the receive buffers of the three readers 699*a*, 699*b* and 699*c*. The readers then extract the destination and source information from the message, and if the reader is identified to be the true destination and if that reader expects a message from the specified source, then the reader extracts the value contents of the message and makes them available at the output port to be read by an IPC Read block.

With respect to the deployment model, 670 of FIG. 6A, it can be executed in simulation mode or deployed on a real-time system. In simulation the IPC channel models such as 677 for IPC2 678 are used to emulate the real-time environment. If no IPC channel is provided for IPC1, then the communication between nodes is assumed to be instantaneous. The real-time system could be a test bed environment for a prototype car or a production automobile. In the real-time system, each of the seven processing nodes, 670*a*, 670*b*, 670*c*, and the four J nodes 675, represent functionality that is converted to executable code (e.g. via C/C++ code) or directly to hardware (e.g. via a hardware description language HDL or by programming an FPGA) or a combination of the two. The IPC channel models are not directly used in the real-time system. However, the IPC channel models can be run in parallel with the real-time system to determine if the IPC channel models are accurate. The difference between the real-time system IPC channel behavior and the IPC channel models can be used to correct the IPC channel model such that its results better match the real-time system.

Model Compilation

Referring back to FIGS. 2A and 2B, when the deployment model for the distributed embedded system is built, the model processing engine 240 compiles the deployment model 230 to simulate or execute the model 230 (step 285). The model processing engine 240 carries out the task of compiling and linking each processing unit of the deployment model 230 to produce an "in-memory executable" version of the model 230 that is used for generating code and/or simulating or linearizing the processing units of the deployment model 230. The compilation stage involves preparing data structures and evaluating parameters, configuring and propagating block characteristics, determining block connectivity, and performing block reduction and block insertion. In the link stage, the model processing engine 240 uses the result of the compiled stage to allocate memory needed for the execution of the various components in the processing units of the deployment model 230. The linking stage also produces block method execution lists which are used by the simulation or linearization of the processing units of the deployment model 230.

Code Generation

After linking has been performed, the code generator 250 may generate code for the processing units of the deployment model 230 (step 286). If this stage is performed, then the stages that follow use the generated code during the execution of the block diagram (step 288). If this stage is skipped completely, then the execution engine 260 may use an interpretive mode for the execution of the block diagram (step 288). An exemplary code generation tool may be found in Real-Time Workshop® from The MathWorks, Inc. The Real-Time Workshop® generates applications from block diagram models for prototyping, testing, and deploying real-time systems on a variety of target computing platforms. The users may direct the Real-Time Workshop® to generate source code that accommodates the compilers, input and output devices, memory models, communication modes, and other characteristics that the applications may require. The code generation will be described below in more detail with reference to FIG. 7.

Figure 7:
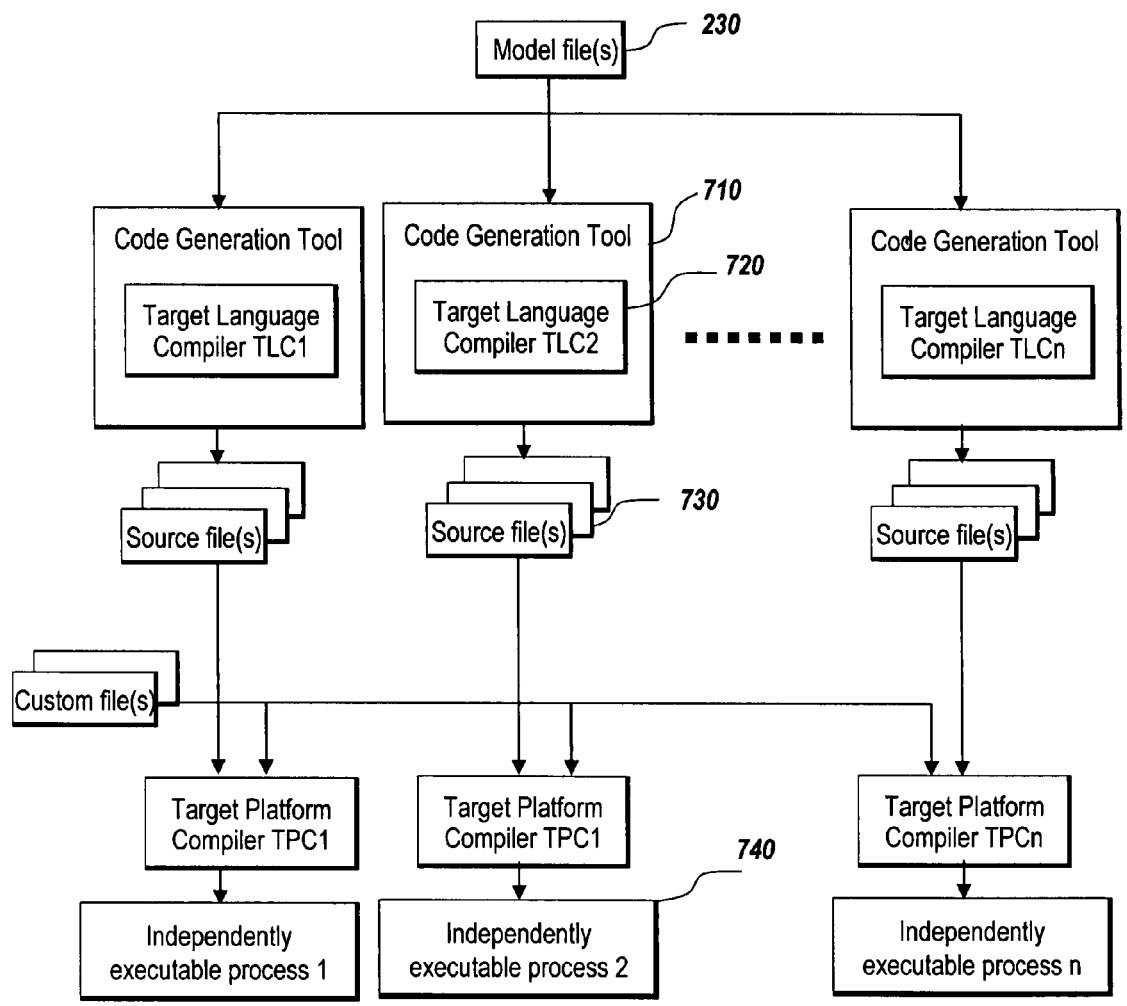
FIG. 7 depicts an exemplary code generation tool for generating an executable file from a model file in the illustrative embodiment of the present invention.

FIG. 7 depicts an exemplary code generation tool for generating source files 730 and executable files 740 from a model file 230 in the illustrative embodiment. The model file 230 contains the deployment model 230 for the distributed embedded system including processing units with the read blocks and write blocks for reading and writing data from and into the IPC channel. The code generation tool 710, such as Real-Time Workshop®, or multiple copies of the code generation tool 710, receives the model file 230. The multiple copies of the code generation tool 710 may operate in parallel through the use of an existing parallel "make" technology such as "GNU Make" and, in parallel, generates the source files 730 and executable files 740 that can be deployed on the various nodes of the multi-processor real-time distributed embedded system. Each executable file is generated such that its physical operation is independent of the operation of other "custom" processes on its execution node.

Each copy of the code generation tool 710 may include a target language compiler (TLC) 720 that generates source code for the part of the model file 230. The target language compiler 720 is an integral part of the code generation tool 710 that enables the users to customize the code generated from the model file 230 and generate optimal code for the blocks in the block diagram model 230. The customization of the code produces platform-specific code that incorporates user defined algorithmic changes for performance, code size, or compatibility with existing methods that the users prefer to maintain. The code generation tool 710 may use templates makefiles to build an executable file 740 from the generated source code.

The code generation tool 710 may inline the S-function read and write blocks to embed the minimal amount of instructions into the generated code. The term "inline" means to specify a textual string in place of the call to the general S-function API routines (e.g. mdlOutputs). That is, the generated code contains the appropriate C code that would normally appear with the S-function routines and the S-function itself has been removed from the build process. If the S-function read and write blocks are inlined, the S-function read and write blocks are indistinguishable from built-in blocks. To inline the S-function read and write blocks, users need to implement the S-function read and write blocks twice: once for building read and write blocks and once for generating code for the read and write blocks. For Example, the users can create the read block using an S-function API and inline the S-function read block in the code generation of the model.

When generating code for the deployment model 230, code for the IPC channel 440 or the associated IPC model 471 is not created at the top model level. The code generation may proceed to generate code for the models referenced by the node blocks 410-430. The sub-models 420' and 430' referenced by the node blocks 420 and 430 both contain a reference to the same model (CL). In this case, code for the model (CL) is used for the code generation of the model 420' and code for the model (CL) is also reused for the code generation of the model 430'. In addition, the generated code for the models referenced by the node blocks 410-430 falls into its own directory and has its own configuration. For example, the model 420' referenced by the node block 420 may be targeted for an MPC 555 from Motorola, Inc. while the model 430' referenced by the node block 430 may be targeted for HC12 from Motorola, Inc. or C2000 from Texas Instruments, Inc.

Simulation/Execution

Referring back to FIGS. 2A and 2B, the deployment model can be simulated with or without the generated code for the model 230 (step 288). If code for the deployment model 230 is generated, the simulation process uses the generated code during the execution of the block diagram (step 288). If the code generation step (step 286) is skipped, then the execution engine 260 may use an interpretive mode for the execution of the block diagram (step 288). In the simulation or execution of the deployment model 230, multiple CPUs 110 can be used to determine the behavior of each processing unit of the deployment model 230. The multiple CPUs 110 may reside in a single electronic device or multiple electronic devices on the network 196. Users may define a single clock in the simulation or execution of the deployment model 230, or may also select different clocks for different processing units of the deployment model 230 so that the processing units operates at different clocks in the simulation or execution of the model 230.

The generated code may be deployed to a real-time embedded system so that the code can be executed in connection with the real-time embedded system. The real-time embedded system executes the deployment model 230 or portions of the deployment model 230 via the generated code on a Real-Time System target. One aspect of deploying (executing) the generated code on a target is the notion of "external mode." External mode refers to a system where Simulink® acts as a monitor and debugger of the generated code running in real-time on a target. In External Mode, users can change parameters and view signals via standard Simulink® elements. Another important aspect of the code generation technology is that it is very extensible. This technology enables the creation of "active scripts" that control how the generated code is produced for a block diagram. Using TLC 720, users can tailor the generated code to suite their specific needs.

Distributed Simulation

The generated code may be deployed to a real-time embedded system so that the code can be executed in connection with one or more host computers. The real-time embedded system executes the deployment model 230 or portions of the deployment model 230 via the generated code on a Real-Time System target. Each host computer executes the deployment model 230 or portions of the deployment model 230 via the interpreted model or via the generated code on a Real-Time System target. One aspect of deploying (executing) the generated code and interpreted model in this way is the notion of "distributed simulation". Distributed simulation refers to a system where Simulink® acts as part of the real-time embedded system. This technology enables the creation of simulated targets which are useful for rapid prototyping of the model 230. The Distributed Simulation may be used in conjunction with the standard monitoring and debugger capabilities of External mode described in the previous paragraph. This includes the changing of parameters and viewing of signals of the simulated system on the host computer. For example, using such functionality, the user is able to detect "deadlocks" due to feedback loops and or blocking IPC features.

Parallel Processing System

Figure 8:
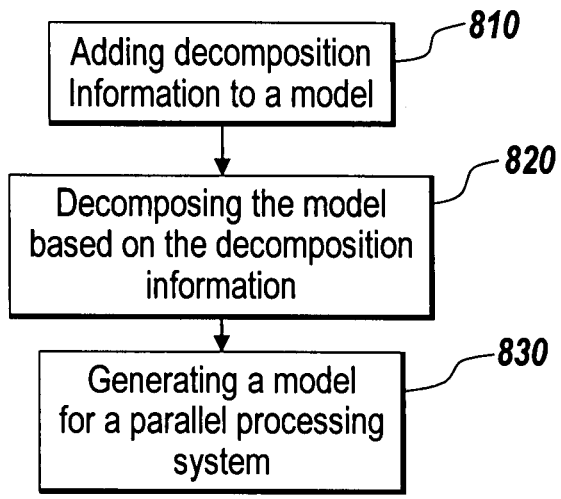
FIG. 8 is a flow chart showing an exemplary operation of another illustrative embodiment of the present invention for generating the block diagram model of a parallel processing system.
Figure 9:
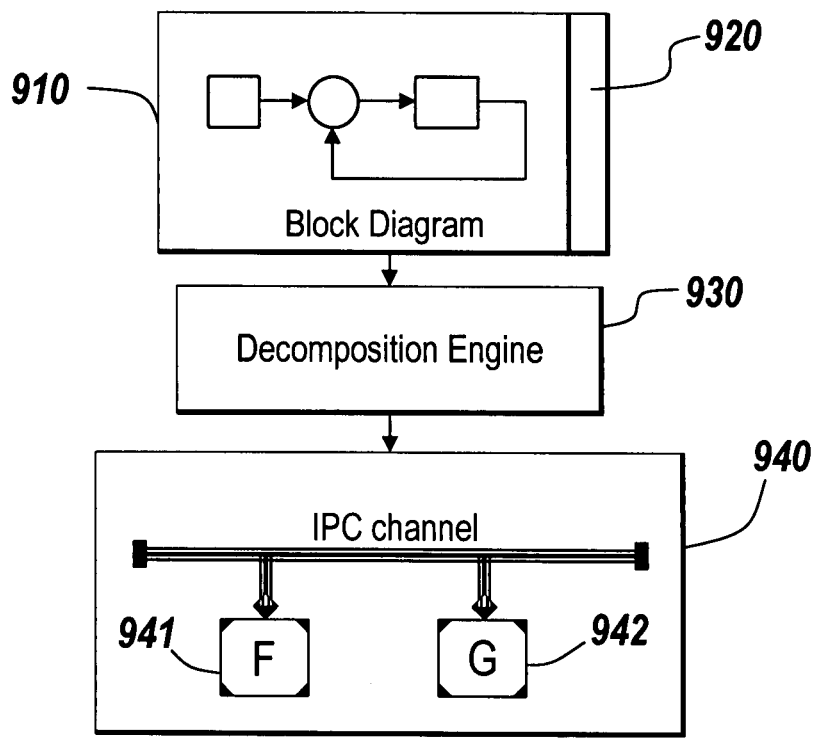
FIG. 9 depicts an exemplary decomposition engine for generating the block diagram of the parallel processing system.

FIG. 8 is a flow chart showing an exemplary operation of another illustrative embodiment of the present invention for implementing a block diagram model of a parallel processing system. In this illustrative embodiment, the parallel computing or processing units are not explicitly defined in a block diagram model, but the block diagram modeling environment has the ability to decompose the model into multiple nodes for faster computing. For this purpose, the users may add decomposition information to the block diagram model, for example, the block diagram model of a filter (step 810). FIG. 9 depicts the block diagram model 910 from which a new block diagram 940 is generated for the parallel computing system using the techniques described above in connection with the modeling of a distributed embedded system. The decomposition information 920 may be obtained from the algorithm of the block diagram model 910, such as a filtering algorithm, and added to the block diagram model 910. The block diagram model 910 is decomposed for parallel and fast computing of the algorithm represented by the block diagram model (step 820). The block diagram modeling environment may include a decomposition engine 930 for decomposing the block diagram model into at least two or more parallel computing or processing units based on the decomposition information contained in the model 910. A new block diagram 940 can be generated by taking the decomposed parallel computing or processing units as the nodes of the new model, as described above with reference to FIGS. 3A-6B (step 830). The parallel computing or processing units may be represented by the node blocks 941 and 942 (Block F and Block G). The node blocks 941 and 942 are interconnected via the IPC channel 943 as the same way as described above in relation to the model of the distributed embedded system. This generated block diagram can remain hidden from the users or optionally provided to the users for debugging purposes. Code generation and deployment either in a general purpose language, such as C, C++, Java and assembly language, or in a hardware description language, such as VHDL, is performed on the block diagram 940 generated by the decomposition engine 930.

Figure 10:
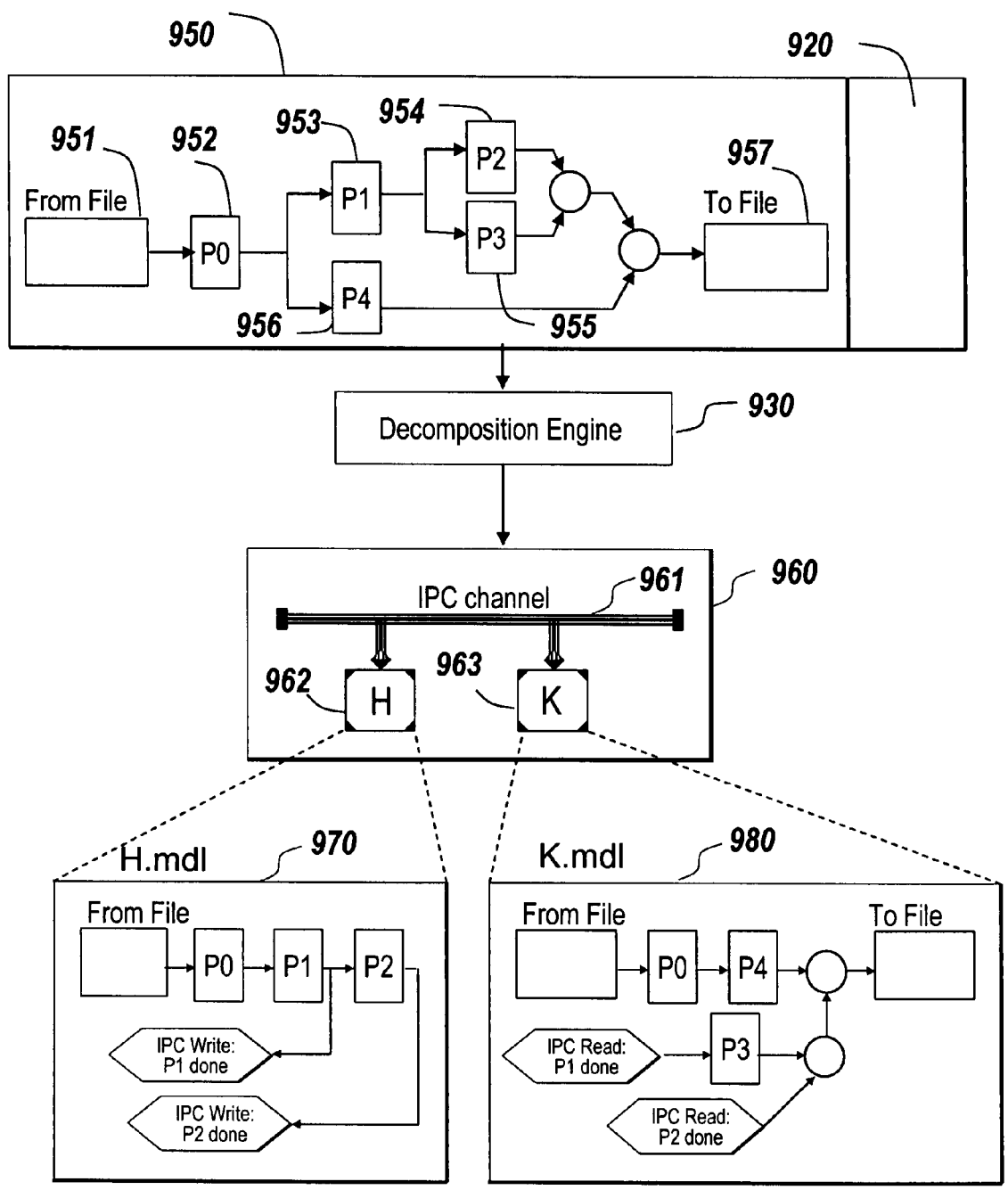
FIG. 10 is a detailed example showing the decomposition of a typical data processing application with parallel and serial data paths.

FIG. 10 depicts a typical data processing application consisting of serial and parallel composition of data paths. In the example, the architecture of the execution environment consists of an IPC channel such as the socket interface over the TCP/IP and two processing units such as two personal computers. The example illustrates one feasible decomposition of the original model 950 into two submodels 970 and 980. Other forms of decomposition are possible. The test for acceptability step 998 in the decomposition allows users to explore various other decompositions. In the illustrated decomposition, the decomposition engine identifies that there are two data paths of equal weight. The first path consists of (P0, P1, P2), the second path consists of (P0, P4, P3). The decomposed model assigns these paths to the submodels 970 and 980 in such a way that ensures that the functionality of the functional model 950 and the parallel execution model 960 are equivalent.

Figure 11:
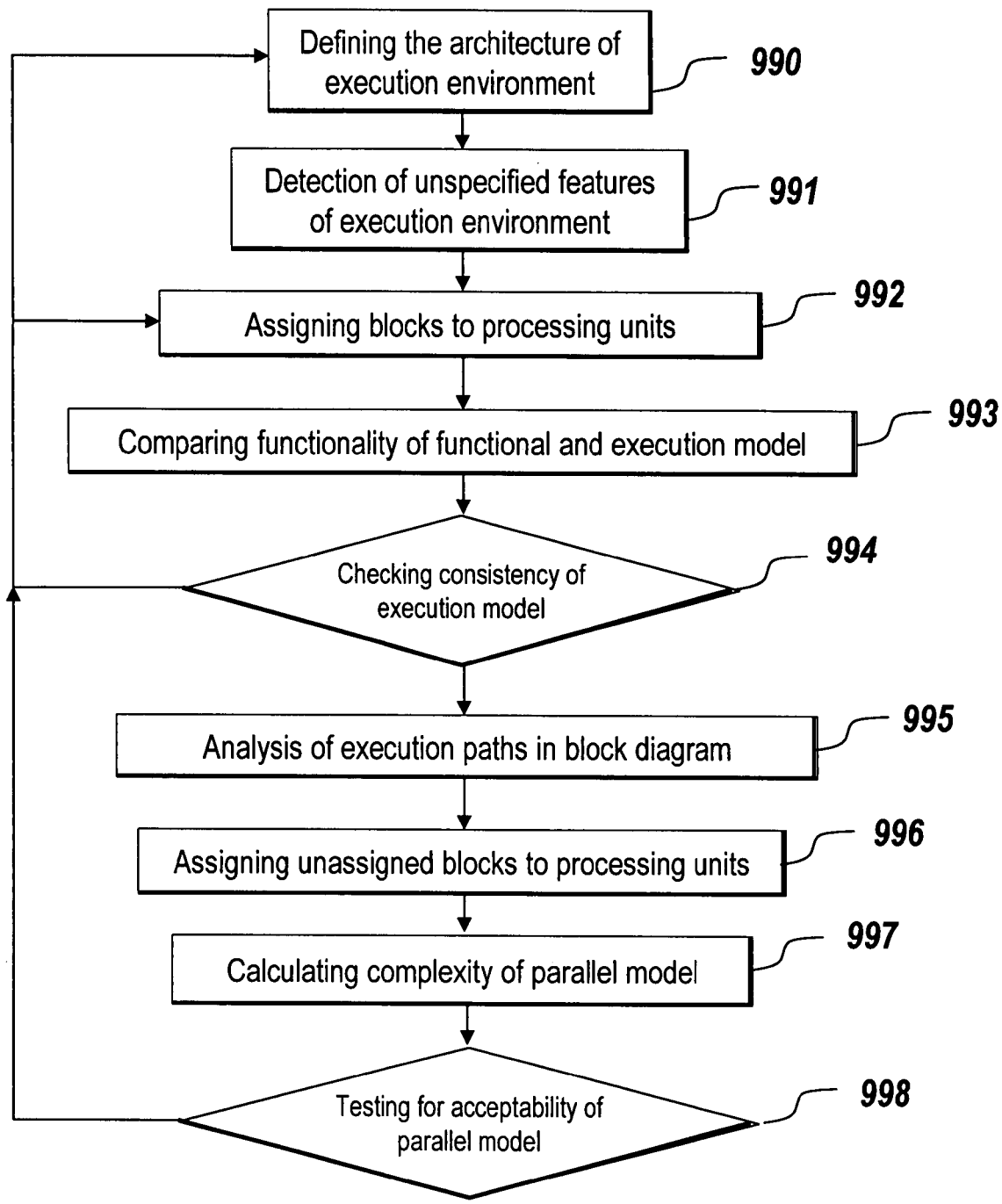
FIG. 11 is a flow chart describing the operation of the decomposition engine for generating the block diagram of a parallel processing system.

With reference to FIG. 11, the decomposition engine operates as follows. In the first step, the decomposition engine receives information from the user specifying the architecture of the execution environment (step 990). This information may contain the enumeration of processing units and specification of the processing characteristics of each unit, including the memory size, memory access characteristics, cache size, floating point characteristics, processor architecture and the processing speed. The information may also contain an enumeration of the inter-process communication units describing the communication capacity, speed and error (packet loss, Bit Error Rate) characteristics and the communication protocol. Subsequently, the decomposition engine performs an automatic probe to determine unspecified features of the execution environment (step 991). For example, the "configure" utility may be used to determine the characteristics of an operating system or processing unit. Another example, a set of messages may be transmitted back and forth to determine the delay, capacity and throughput of an inter-process communication channel. The user is then asked to assign blocks to processing units (step 992). The user may or may not choose to do such an assignment or may do a partial assignment. Based on the user assignment, the decomposition engine then compares the functionality of the functional and partially specified execution model (steps 993 and 994). If there are inconsistencies in the functionality or if the user assignment is done is such a way that would lead to inconsistencies, the user is asked to revise the architectural specification and block assignments. In step 995, the decomposition engine, performs an analysis of the execution paths in the block diagram. The analysis consists of a forward search starting from the initial condition that resulted from the users block assignment. The search traverses the graph and performs a multiple-objective optimization where the optimization parameters are total speed, total size and communication capacity. The user may define the "weight" that is given to the speed, size or capacity used in the optimization objective. This step of the analysis may use standard optimization algorithms. Subsequent to the analysis, in step 996, the deployment engine assigns blocks to processing units. The assignment is based on the decomposition of the block diagram into the paths as described in step 995. The assignment may be performed, for example, by the use of a standard "integer assignment" optimization algorithm. Finally, in step 997, the decomposition engine calculates the complexity of the generated parallel model. The complexity is a function of the processing characteristics and the inter-process communication channel characteristics. The complexity is specified by assigning multi-valued labels to data paths in the functional model. The various values in the labels include end-to-end delay, average delay, memory requirement, communication capacity requirements. The results of the analysis are reported to the user and based on these results the user may modify both the architecture specification and the block assignment to improve the complexity of the parallel model (step 998).

One of ordinary skill in the art will appreciate that the compilation, code generation and simulation/execution of the model for the parallel processing system can be performed in the same way as the compilation, code generation and simulation/execution of the model for the distributed embedded system described above with reference to FIGS. 2A, 2B and 7.

In summary, the illustrative embodiment of the present invention provides for modeling multiprocessor systems in a block diagram modeling environment. The model is implemented using a block diagram modeling tool in the illustrative embodiment, but the model may be implemented in other modeling environments. The modeling environment provides node blocks for representing processing units of the multiprocessor system. The modeling environment also provides a communication channel for interconnecting the node blocks of the model for the multiprocessor system. The modeling environment enables the users to build the model of the multiprocessor system using the node blocks and the communication channel. The node blocks may include at least one read element for reading data from the communication channel. The nodes may also include at least one write element for writing data into the communication channel. The processing units of the multiprocessor system can communicate with other processing units via the communication channel using the read and write blocks.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any other modeling environments including textual and graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. One or more non-transitory computer-readable media comprising:
   one or more instructions that, when executed, cause at least one computing device to:
      receive information related to a plurality of processors contained in a multi-processing environment and parameters of the multi-processing environment;
      receive information related to a functional model, wherein the functional model includes a plurality of processes to be performed;
      create a deployment model from the functional model, where:
         the deployment model comprises a plurality of processing units for carrying out processing of the processes of the functional model and referencing a plurality of sub-models from the functional model,
         a processing unit of the deployment model represents a processor contained in the multi-processing environment,
         the plurality of processes included in the functional model are distributed to the plurality of processing units of the deployment model for being executed by the plurality of processing units when the deployment model executes;
      automatically calculate a measure of complexity of the deployment model based on processing characteristics of the plurality of processors and characteristics of an inter-process communication channel interconnecting the plurality of processing units, where:
         the processing characteristics of the plurality of processors are determined using the information related to the plurality of processors contained in the multi-processing environment and the parameters of the multi-processing environment;
      determine that the automatically calculated measure of complexity fails to satisfy a user-set criteria; and
      re-distribute the plurality of processes to the plurality of processing units upon determining that the calculated measure of complexity fails to satisfy the user-set criteria.

2. The computer readable medium of claim 1, further comprising:
   one or more instructions that, when executed, cause at least one computing device to:
      generate first code to simulate each of the plurality of sub-models referenced by the plurality of processing units, wherein same code is used for each reference to the selected sub-model;
      execute the generated first code for each of the plurality of sub-models in order to simulate the functional model; and
      evaluate the efficiency and complexity of the simulated functional model.

3. The computer readable medium of claim 2, wherein the generated first code for each of the plurality of sub-models is based on the received information related to a processing unit referencing each of the plurality of sub-models.

4. The computer readable medium of claim 2, further comprising:
one or more instructions that, when executed, cause at least one computing device to:
generate second code to simulate communication channels between the plurality of processing units; and
execute the generated second code for each of the communication channels in order to simulate the functional model.

5. A computer-implemented method comprising:
receiving, using a computing device, a functional model of a multi-process system in a graphical modeling environment, the functional model including a plurality of functional units;
decomposing, using the computing device, the plurality of functional units of the functional model into a plurality of sub-models in a decomposed model, where:
each sub-model is assigned to at least one process of the multi-process system for being executed by the at least one process when the multi-process system executes, and
at least two of the sub-models communicate with each other;
creating, using the computing device, an inter-process channel (IPC) model for representing dynamics of reading and writing operations between the at least two communicating sub-models; and
calculating, using the computing device, a measure of complexity of the decomposed model as a function of processing characteristics of one or more processes of the multi-process system and characteristics of the IPC channel model.

6. The computer-implemented method of claim 5, further comprising:
generating first code for each of the sub-models,
wherein the generated first code is specific to a processor that will execute the generated first code,
wherein the generated first code will simulate the at least one process included in the sub-model, and
wherein same code is used for each one of the at least one sub-model.

7. The computer-implemented method of claim 6, further comprising:
generating, using the computing device, second code to simulate the IPC model.

8. The computer-implemented method of claim 7, further comprising:
executing, using the computing device, the generated first and second code for each sub-model and IPC model to simulate the multi-process system represented by the functional model.

9. The computer-implemented method of claim 8, further comprising:
automatically changing, using the computing device, the sub-models based on execution of the generated first and second code for each sub-model and IPC model.

10. The computer-implemented method of claim 8, further comprising:
changing, using the computing device, the sub-models based on user input after execution of the generated first and second code for each sub-model and IPC model.

11. A device comprising:
a processor executing one or more instructions for:
enabling a user to create a functional model for a multi-process system;
decomposing the functional model into a decomposed model including a plurality of sub-models which read and write data over communication channels, wherein a first sub-model and a second sub-model of the plurality of sub-models comprise at least one common further sub-model;
assigning a sub-model of the functional model to one of processors associated with the multi-process system;
calculating a measure of complexity of the decomposed model as a function of processing characteristics of the processors associated with the multi-process system and characteristics of the communication channels;
optimizing the functional model by reassigning one or more sub-models to different processors;
generating code to simulate each sub-model and each communication channel, where the generating includes:
generating code for the at least one common further sub-model when generating code for the first sub-model,
reusing the generated code for the at least one common further sub-model when generating code for the second sub-model;
executing the generated code for each sub-model and each communication channel in order to simulate the functional model of the multi-process system; and
evaluating the simulated functional model of the multi-process system.

12. The device of claim 11, wherein the enabling a user to create a functional model includes:
receiving parameters associated with processors further associated with the multi-process system.

13. The device of claim 11, wherein the evaluating the simulated functional model of the multi-process system includes:
evaluate evaluating efficiency and complexity of the functional model.

14. A computing device comprising:
a memory storing instructions for implementing an interface to enable a user to:
create a functional model for a multi-process system in a graphical modeling environment, and
enter weights associated with operating parameters of the multi-process system; and
a processor:
executing a decomposition engine to decompose the functional model into a plurality of sub-models that communicate over communication channels,
a sub-model includes at least one process of the multi-process system, and
a communication channel represents dynamics between communicating sub-models, and
the decomposition engine creates the sub-models based on an analysis and optimization of the operating parameters of the multi-process system;
creating a deployment model from the sub-models; and
calculating a measure of complexity of the deployment model as a function of processing characteristics of one or more processes of the multi-process system and characteristics of the communication channels.

15. The device of claim 14, wherein the decomposition engine assigns processes contained in the multi-process system to the sub-models based on an analysis and optimization of the operating parameters of the multi-process system.

16. The device of claim 15, further comprising:
a code generation engine to generate code for each sub-model and communication channel.

17. The device of claim 16, wherein the decomposition engine executes the generated code for each sub-model and communication channel to simulate and evaluate the functional model for a multi-process system.

18. The device of claim 17, wherein the decomposition engine reassigns processes to sub-models based on results of the simulated and evaluated functional model for a multi-process system.

* * * * *

UNITED STATES PATENT AND TRADEMARK OFFICE
CERTIFICATE OF CORRECTION

PATENT NO. : 8,478,577 B2
APPLICATION NO. : 11/894389
DATED : July 2, 2013
INVENTOR(S) : John Edward Ciolfi It is certified that error appears in the above-identified patent and that said Letters Patent is hereby corrected as shown below:

On the Title Page:

At item (73) Assignee, "The Math Works, Inc." should be --The MathWorks, Inc.--.

At item (63) Related U.S. Application Data, after "May 31, 2005" insert --now Patent No. 8,447,580--.

In the Specification:

At column 3, line 60, change "." to --;--.

Signed and Sealed this
Third Day of September, 2013

Teresa Stanek Rea
*Acting Director of the United States Patent and Trademark Office*